United States Patent Office

3,718,467
Patented Feb. 27, 1973

3,718,467
POSITIVE WORKING PHOTOGRAPHIC PROCESS FOR PRODUCING COLORED IMAGES OF METAL CHELATES OF SULFUR COMPOUNDS
Eiichi Inoue and Toshihiro Yamase, Tokyo, Japan, assignors to Canon Kabushiki Kaisha, Tokyo, Japan
No Drawing. Continuation-in-part of abandoned application Ser. No. 774,178, Nov. 7, 1968. This application Mar. 25, 1971, Ser. No. 128,201
Int. Cl. G03c 5/24
U.S. Cl. 96—48 R
7 Claims

ABSTRACT OF THE DISCLOSURE

Colored images are obtained by imagewise exposing a composition containing a sulfur compound such as a dithiocarbamate, thioxanthate or N,N-diacetic acid derivative of a dithiocarbamate in order to photolyze said sulfur compound and then treating the photolyzed composition with a metal salt.

This application is a continuation-in-part of our copending application Ser. No. 774,178, filed Nov. 7, 1968, now abandoned.

This invention relates to a process for light fixing recording and compositions for the recording. More particularly, this invention relates to a process which comprises using a photolysis reaction of specific sulfur compounds to form latent images and chelating the latent images with a suitable metal to produce stable and sharp colored images. Heretofore, various recording processes utilizing photolysis reaction of various substances have been known. For example, U.S. Patent 3,094,417 discloses a process which comprises the photolysis of a reducing substance to form latent images followed by the addition of reducing metal salts of aliphatic acids. The present invention is not concerned with oxidizing and reducing reactions as mentioned above, but with a process in which specific sulfur compounds capable of photolysis react with metal salts to form chelates thereby producing color-developed images. The sulfur compounds useful in the present invention can be readily prepared by known procedures. The color-developed images of the metal chelates of the sulfur compounds prepared according to this invention are heat resistant, light resistant and chemically resistant. Any desirable colored images can be obtained by appropriately selecting the metal salts.

It is an object of this invention to provide a coloring process of a recording composition which gives long-lasting and superior colored images. It is another object of this invention to improve the photosensitivity of recording compositions. It is a further object of this invention to provide a process for increasing the rate of photolysis of recording compositions.

The compositoins of recording materials useful in this invention are divided into the following two groups:

FIRST COMPOSITION

Sulfur compound
Optical sensitizer
Chemical sensitizer
Stabilizer
Binder
Plasticizer
Solvent

SECOND COMPOSITION

Metal salt
Binder
Solvent

The above materials are included in the recording material and recording process of the present invention.

The sulfur compound in the first composition absorbs light thereby causing a photolysis reaction and the resulting sulfur compound loses its ability to form a metallic chelate with the second composition, that is, it is light fixed. Therefore, when a system of the first composition is imagewise exposed to light and dark patterns, latent images are formed according to the degree of the photolysis reaction. The second composition is then chemically applied to the latent images to react the first composition with the second composition producing the metal chelate thereby giving colored images. For example, when an imagewise exposure of a positive original pattern is applied, a positive colored image is obtained.

Representative examples of the materials used in the first and second compositions are shown below.

(1) The sulfur compounds may be represented by the following general Formulas I, II and III:

(A) Dithiocarbamate

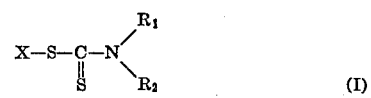
(I)

wherein $R_1$ and $R_2$ are the same or different and are selected from the group consisting of hydrogen, alkyl, alkenyl, aryl and alkoxy. $R_1$ and $R_2$ may also bear inert substituents such as halogen, nitro, carboxy, and amino groups. X is selected from the group consisting of monovalent metal ions and ammonium ion.

Examples of dithiocarbamates include:

(1) 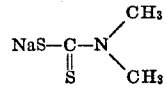

(2) 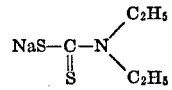

(3) 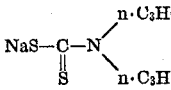

(4) 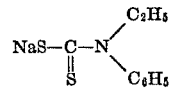

The dithiocarbamates of the present invention can be prepared by known processes, see, for example, Recueil, 70, pps. 922, 935–936 (1951). One method of preparing these compounds comprises adding sodium hydroxide to a mixture of carbon disulfide, water and a substituted amine with stirring to form the corresponding dithiocarbamate.

(B) Thioxanthates

(II)

wherein $R_3$ is selected from the group consisting of hydrogen, alkyl, alkenyl, aryl and alkoxyl. $R_3$ may also bear inert substituents such as halogen, nitro, carboxy and amino groups. X is selected from the group consisting of monovalent metal ions and ammonium ion.

Examples of thioxanthates include:

(1) $\quad KS-\underset{\underset{S}{\|}}{C}-S-CH_3$ (2) $\quad KS-\underset{\underset{S}{\|}}{C}-S-C_2H_5$ (3) $\quad KS-\underset{\underset{S}{\|}}{C}-S-n\cdot C_3H_7$ (4) $\quad KS-\underset{\underset{S}{\|}}{C}-S-C_4H_5$ The thioxanthates of the present invention can be prepared by known processes, see for example, Organic Chemistry of Bivalent Sulfur, vol. IV, pg. 178 (1962). Alkyl mercaptans can be reacted with carbon disulfide and concentrated aqueous alkali, such as sodium hydroxide, to prepare the corresponding thioxanthate.

(C) N,N-diacetic acid derivatives of dithiocarbamates.

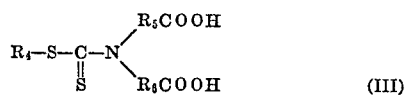

(III)

where $R_5$ and $R_6$ are the same or different and are selected from the group consisting of alkylene, alkenylene, arylene and alkylenoxy. $R_4$ is selected from the group consisting of hydrogen, alkyl, aryl, alkenyl and alkoxy. $R_4$, $R_5$ and $R_6$ may also bear inert substituents such as halogen, nitro, carboxy or amino groups.

Examples of N,N-diacetic acid derivatives of dithiocarbamates include:

(1) $\quad n\text{-}C_3H_7-S-\underset{\underset{S}{\|}}{C}-N\underset{CH_2COOH}{\overset{CH_2COOH}{\diagup}}$ (2) $\quad n\text{-}C_3H_7-S-\underset{\underset{S}{\|}}{C}-N\underset{C_2H_4COOH}{\overset{C_2H_4COOH}{\diagup}}$ (3) $\quad n\text{-}C_3H_7-S-\underset{\underset{S}{\|}}{C}-N\underset{C_6H_4COOH}{\overset{CH_2COOH}{\diagup}}$ N,N-diacetic acid derivatives of dithiocarbamates can be prepared by reacting carbon disulfite, an N,N-diacetic acid amine derivative and aqueous sodium hydroxide to form the salt of the N,N-diacetic acid derivative of dithiocarbamate. This salt reacts easily with chlorides to form the corresponding hydrocarbon N,N-diacetic acid derivative of dithiocarbamate.

(2) Optical sensitizers are employed in this invention to increase the sensitivity of the sulfur compounds to light. Coloring materials generally used for silver salt photography and electrophotography may be effectively used as such optical sensitizers. For example, the following materials may be used:

Rose Bengal
Phloxine
Erythrosine
Uranine
Eosine
Rhodamine B
Fuchsin
Crystal Violet
Acridine Orange
Methylene Blue
Bromophenol Blue (3) Chemical sensitizers are employed in this invention to increase the rate of photolysis of the sulfur compounds. Compounds which give a heavy atom effect in photolysis reactions are employed for this purpose.

Representative examples of these compounds are as follows:

(A) Halogen compounds such as methylene dibromide,
ethylene dibromide,
iodoform,
carbon tetrachloride,
tetrabromomethane,
propyl iodide,
propyl bromide,
propyl chloride,
methyl iodide,
bromonaphthalene derivative,
iodonaphthalene derivative,
bromoform,
methylene iodide,
methylene chloride,
ethylene dichloride,
ethylidene bromide,
acetylene terachloride,
acetylene dichloride,
trichloroethylene,
trimethylene bromide,
tetramethylene bromide,
pentamethylene bromide,
hexamethylene bromide,
benzyl iodide,
benzyl bromide,
iodobenzene derivative
bromobenzene derivative,
ethyl iodide, and the like.

(B) Metallic compounds and the like such as tetraphenyl zinc,
tetraphenyl tin,
tetraphenyl silicon,
triphenylamine,
triphenyl phosphorus,
triphenyl arsenic,
triethyl aluminum,
trimethyl aluminum,
Michler's ketone,
benzil
benzoin,
benzophenone,
benzophenone derivatives,
phenyl salicylate,
stilbene derivatives, and the like.

(4) Stabilizers for the sulfur compounds are used in this invention, and the following compounds are representative examples:

Alkali metal (Group I of Periodic Table) compounds such as potassium chloride, sodium chloride, potassium hydroxide, sodium hydroxide, and the like;

Amine compounds such as aqueous ammonia, trimethylamine, dimethylamine, aniline derivatives and the like.

(5) Compositions of recording materials employed in this invention may be dispersed into chemically inert carriers such as, for example, resinous inert carriers to form a thin film or a thin layer, which is supported on a self-supporting material.

The chemically inert resinous materials which may be employed in this invention are, for example, as follows:

gelatin,
polyvinylalcohol,
carboxymethyl cellulose,
polyvinylpyrrolidone,
ethyl cellulose,
cellulose nitrate, cellulose acetate,
polyvinyl chloride,
polystyrene,
polyvinyl acetate,
polymethylmethacrylate,
cellulose acetate polymer,
cellulose propionate polymer,
cellulose acetate butyrate,
bicarbonate polymer,
acrylonitrile polymer,
polyamide,
polymethylstyrene,
polystyrenebutadiene,
polyvinylacetal,
polyvinylbutyral,
paraffin,
wax, and the like.

The self-supporting materials which are useful as a backing in the present invention include paper, resin, glass, metal, fiber, wood, ceramics and the like.

(6) Representative plasticizers useful in this invention are, for example, triglycylphosphate,
polyethylene glycol,
dioctylphthalate,
di(2-ethylhexyl)maleate,
di(2-ethylhexyl)tetrahydrophthalate,
tri(2-ethylhexyl)phosphate, and the like.

(7) Representative metal salts useful as chelating agents in this invention are, for example, copper, iron, cobalt, nickel, manganese, bismuth, mercury, lead, barium, molybdenum, gold salts, etc., particularly, aliphatic acid salts such as cobalt acetate, nickel acetate, silver caproate, silver caprylate, silver behenate, iron stearate, cobalt naphthenate, copper palmitate, copper oleate, and the like, and inorganic salts such as ferric chloride, copper sulfate, nickel sulfate, and the like.

The colors of the chelates produced by reacting the respective metals with sodium N,N-dimethyldithiocarbamate, potassium ethylthioxanthate, and n-propyl N,N-diacetic acid dithiocarbamate, which are representative examples of sulfur compounds (I), (II) and (III), respectively, are shown in Table 1 below.

TABLE 1

| Ex. | Metal salt | Sulfur compound (I) | (II) | (III) |
|---|---|---|---|---|
| 1 | Cd | White | Light yellow | |
| 2 | Mn | Purple | | |
| 3 | Ni | Yellowish brown | Reddish purple | Yellow. |
| 4 | Zn | White | White | White. |
| 5 | Co | Dark green | Yellowish green | Yellow. |
| 6 | Ag | Black | Black | Orange black |
| 7 | Cu | Dark red | Dark red | Green. |
| 8 | Fe | Dark green | Black | Black. |

In Table 1 above, the sulfur compounds (I), (II) and (III) are as follows:

(I) 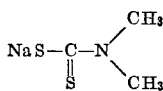

(II) 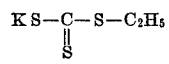

(II) 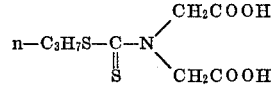

As is shown in Table 1 above, according to this invention, it is possible to obtain a desired colored image by selecting appropriately a metal salt from the system of the second composition and to further obtain a colored image of optional mixed color by using a mixture of two or more metal salts. When two or more metal salts are used together, it is preferable to appropriately select the concentrations of the metal salts since the chelating rates of various metal salts usually differ.

Furthermore, it is possible to appropriately select and combine the sulfur compounds, (I), (II) and (III), to form the system of the first composition. In this case, the wave length range can be widened and the photolysis efficiency can be increased by using the compounds in combination since the wave length range of light absorption of each sulfur compound and the photolysis efficiency thereof differ.

The preferable formulation of each composition in this invention is shown in Table 2 where the unit is parts by weight.

TABLE 2

The first composition:

| | |
|---|---|
| Solvent | 500–1000 |
| Binder | 100 |
| Sulfur compound | 10–200 |
| Optical sensitizer | 0.05–1.0 |
| Chemical sensitizer | 1–100 |
| Stabilizer | 0–30 |
| Plasticizer | 10–100 |

The second composition:

| | |
|---|---|
| Metal salt | 10–200 |
| Binder | 100 |

The constitution of the recording member and the process of this invention are explained below.

(a) A system composed of the first composition is supported on paper or other self-supporting material. If desired, the first composition excluding the binder (usually a chemically inert resinous carrier) may be directly applied to the supporting material.

The system of the second composition is used as a developing liquid by dissolving the system in an appropriate solvent such as water, organic solvents and the like. Therefore, a colored image can be produced by subjecting to imagewise exposure a recording member made of the system of the first composition to form a latent image and immersing the resulting recording member in a developing liquid comprising the system of the second composition.

(b) A system composed of the first composition and a system composed of the second composition are supported on paper or other self-supporting material in the same manner as in process (a) above. If desired, the binder may be excluded in the system of the second composition.

In this case, imagewise exposure is applied to a recording member composed of the first composition to form a latent image, and then a recording member composed of the second composition is closely contacted with the recording member on which the latent image is formed, and thereafter, the second composition is dispersed and transferred to the first composition to produce a color developed image.

It is also possible to obtain a color developed image in the same manner by disperse-transferring the first composition to the system of the second composition.

(c) A mixture system of the first composition and the second composition, or the two layer system thereof, is supported on a self-supporting material. In this case, it is necessary to physically separate the respective compositions so as to prevent a chemical reaction between the respective compositions, but to retain them in such a manner that an internal chemical reaction can be carried out.

Therefore, when the recording matter composed of the above mentioned system is used, the imagewise exposure is first applied to a recording member to form a latent image by photolysis of the first composition through the application of the imagewise exposure to the recording member. Chelation of the respective compositions is then carried out by using such means as pressure, heat, electricity and the like to bring about an internal chemical reaction to obtain a color developed image.

The following examples are given by way of illustration only and the present invention will not be limited thereto.

The solutions of the following compositions were prepared in accordance with the prescriptions given in Table 3 through Table 5.

TABLE 3

| Example | Sodium N,N-dimethyl-dithiocarbamate, mg. | Erythrosine, mg. | Ethylene dibromide, mg. | Benzophenone, mg. | Ethanol, ml. |
|---|---|---|---|---|---|
| 1 | 50 | | | | 10 |
| 2 | 50 | 5 | | | 10 |
| 3 | 50 | | 10 | | 10 |
| 4 | 50 | | | 20 | 10 |
| 5 | 50 | 5 | 10 | | 10 |
| 6 | 50 | | | 20 | 10 |
| 7 | 50 | 5 | 10 | 20 | 10 |
| 8 | 50 | 5 | 10 | 20 | 10 |

TABLE 4

| Example | Potassium ethylthioxan, mg. | Crystal violet, mg. | Iodoform, mg. | Benzoin, mg. | Ethanol, ml. |
|---|---|---|---|---|---|
| 9 | 50 | | | | 10 |
| 10 | 50 | 5 | | | 10 |
| 11 | 50 | | 10 | 20 | 10 |
| 12 | 50 | 5 | | | 10 |
| 13 | 50 | 5 | 10 | 20 | 10 |

TABLE 5

| Example | n-Propyl N,N-diacetic-acid dithiocarbamate, mg. | Acridine orange, mg. | Methylene iodide, mg. | Ethanol, ml. |
|---|---|---|---|---|
| 14 | 50 | | | 10 |
| 15 | 50 | 5 | | 10 |
| 16 | 50 | | 10 | 10 |
| 17 | 50 | 5 | | 10 |
| 18 | 50 | 5 | 10 | 10 |

The system of the first composition in the above tables is uniformly coated on one-sided art paper whose thickness is about 80μ in such a manner that the thickness of the coating becomes about 1 to 2μ. The coating is dried, and imagewise exposure is applied to the above obtained recording member through a positive original pattern by using a 150 W Toshiba Mercury Lamp (at a distance of 20 cm.) as the light source for an exposure time of from about 1 to 10 minutes.

Then, a 20% copper sulfate solution is used as a developing liquid to develop the recording member bearing the latent image, and clear positive color developed images are obtained on the respective recording member.

When ammonium N,N-dimethyldithiocarbamate is substituted for the sodium N,N-dimethyldithiocarbamate in Examples 1–8 similar results are obtained.

When ammonium ethylthioxanthate is substituted for the potassium ethylthioxanthate in Examples 9–13 similar results are obtained.

EXAMPLE 19

In place of the ethanol solvent which is used in Examples 1 through 18, a 10% ethyl cellulose ethanol solvent is used to obtain a recording member, and the same results are obtained.

EXAMPLE 20

In place of the ethanol solvent which is used in Examples 1 to 18, a 10% aqueous solution of gelatin is used to form a recording member, and the same results are obtained.

In this case, the first compositions insoluble in water are excluded.

EXAMPLE 21

Sodium N,N-dimethyldithiocarbamate _____ mg__ 25
Potassium ethylthioxanthate _____ mg__ 25
Acridine orange _____ mg__ 5
Ethylene dibromide _____ mg__ 10
Ethanol _____ ml__ 10

EXAMPLE 22

Sodium N,N-dimethyldithiocarbamate _____ mg__ 20
Potassium ethylthioxanthate _____ mg__ 20
n-Propyl N,N-diacetic acid dithiocarbamate ____ mg__ 10
Rose bengale _____ mg__ 5
Ethanol _____ ml__ 10

In accordance with the prescriptions of Examples 21 and 22, Mylar film of about 50μ in thickness, is coated with the coating compositions in such a manner that the thickness of the coating is about 2μ and then dried.

Imagewise exposure is applied to the recording member through a positive original pattern using a 150 W Tungsten Lamp (from a distance of 20 cm.) as the light source for about 5 minutes. Then, a 20% cobalt acetate solution is used as the developing liquid to develop the latent image, and clear positive color developed images are obtained.

EXAMPLE 23

Recording member composed of the system of the first composition:

Sodium N,N-dimethyldithiocarbamate _____ mg__ 50
Acridine orange _____ mg__ 5
Ethylene dibromide _____ mg__ 10
Ethanol _____ ml__ 10

Recording member composed of the system of the second composition:

Copper oleate _____ mg__ 100
Toluene _____ ml__ 10

A recording member is prepared by uniformly coating the above prescribed coating compositions on one-sided art paper whose thickness is about 80μ.

Imagewise exposure is applied to the recording member composed of the system of the first composition using a 150 W Toshiba Mercury Lamp for about three minutes through a positive original pattern. Then, the recording member composed of the system of the second composition is closely contacted to the recording member bearing the latent image for about 10 minutes to produce clear positive color developed image on the first recording matter.

A color developed image is also obtained on the second recording member.

EXAMPLE 24

The same results are obtained when a system in which 10% ethyl cellulose is used in place of ethanol in the system of the first composition, and the system in which 10% polystyrene (toluene) is used in place of toluene in the system of the second composition, are used.

In this case, when the side of the second recording matter is heated with a metal plate at 110° C. while keeping the second recording member in a closely contacted state, a color developed image is effectively obtained.

EXAMPLE 25

System of the first composition:

Sodium N,N-dimethyldithiocarbamate _____ mg__ 100
Erythrosine _____ mg__ 10
Ethylenedibromide _____ mg__ 20
Ethylcellulose _____ g__ 1
Ethanol _____ ml__ 20

System of the second composition:

Copper oleate _____ mg__ 200
Polystyrene _____ g__ 1
Toluene _____ ml__ 20

The system of the second composition is uniformly applied to a one-sided art paper whose thickness is about 80μ in such a manner that the thickness of the coating is about 2μ, and the coating is dried. The system of the first composition is then uniformly applied thereto to a thickness of 1μ and then dried. Imagewise exposure is applied to the above prepared recording matter using a 150 W Mercury Lamp for about 10 minutes through positive original pattern, and then the recording member bearing the above obtained latent image is heated with a metal plate which was heated at about 110° C., and clear color developed images are obtained.

EXAMPLE 26

Sodium N,N-dimethyldithiocarbamate is prepared as follows: To 340 ml. of 40% dimethylamine are added dropwise 185 ml. of carbon disulfide and then 120 g. of sodium hydroxide in 300 ml. of water and the reaction temperature is kept at 10–15° by cooling. The reaction mixture is stirred at room temperature for two hours and then concentrated in vacuo and allowed to cool. The precipitate is then filtered, washed and dried to yield the desired product.

EXAMPLE 27

Sodium di-(β-hydroxyethyl) dithiocarbamate is prepared as follows: To a mixture of 2.1 g. of diethanolamine, 1.52 g. of carbon disulfide and 25 ml. of water is added a solution of 0.8 g. of sodium hydroxide in 25 ml. of water with stirring which is continued for two hours. Evaporation, purification and crystallization yields the desired product.

EXAMPLE 28

Sodium methyldithiocarbamate is prepared as follows: To a mixture of 7.6 g. of carbon disulfide, 50 ml. of water and 6.8 g. of methylamine hydrochloride is added a solution of 8 g. of sodium hydroxide in 40 ml. of water with stirring which is continued for two hours. The mixture is then evaporated and the sodium chloride which forms is filtered off. Further filtration, crystallization and purification yields the desired product.

EXAMPLE 29

An N,N-diacetic acid derivative of the formula

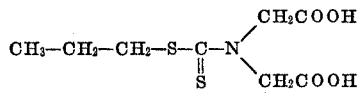

is prepared as follows: 13.3 g. of imino diacetic acid, 10 g. of sodium hydroxide and 40 ml. of carbon disulfide are added to a solvent mixture of 10 ml. of dimethylformamide and 20 ml. of water. A solution of 40 ml. of n-propylchloride in 12 ml. of dimethylformamide is added thereto and the resulting solution is refluxed at 40–50° C. for a period of about 5 hours. After cooling, the precipitated white solid is filtered and washed to yield the desired product.

EXAMPLE 30

An N,N-diacetic acid derivative of the formula:

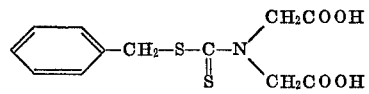

is prepared as follows: 13.3 g. of amino diacetic acid, 10 g. of sodium hydroxide and 30 ml. of carbon disulfide are added to a solvent mixture of 10 ml. of dimethylformamide and 20 ml. of water. A solution of 12 ml. of benzyl chloride and 30 ml. of dimethylformamide is added thereto and the resulting solution is refluxed for 3 hours at a temperature of 50–60° C. The resulting yellow solid is washed with 50 ml. of benzene to give a white solid which is the desired product.

EXAMPLE 31

An N,N-diacetic acid derivative of the formula:

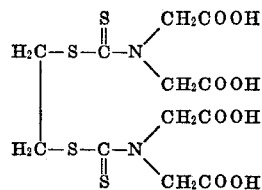

is prepared as follows: 13.3 g. of amino diacetic acid, 10 g. of sodium hydroxide, 8 ml. of carbon disulfide and 3 ml. of 1,2-dichloroethane are added to a solvent mixture of 75 ml. of ethanol and 100 ml. of water and refluxed at 40–50° C. for 6 hours. After cooling the reaction forms a three layer solution. The middle layer is extracted and 5 ml. of perchloric acid are added thereto. Extraction with ether yields a yellow solid which is then washed and dried to yield the desired product.

What is claimed is:

1. A process for forming a colored image which comprises imagewise exposing to light a composition on a self-supporting material capable of undergoing photolysis in the presence of said light said composition containing at least one compound selected from the group consisting of dithiocarbamate compounds having the formula (I) 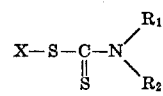

wherein $R_1$ and $R_2$ are the same or different and are selected from the group consisting of hydrogen, alkyl, alkenyl, aryl and alkoxy, X is a member selected from the group consisting of alkali metal ions and ammonium ion; thioxanthate compounds having the formula

 (II)

wherein $R_3$ is selected from the group consisting of hydrogen, alkyl, alkenyl, aryl and alkoxy, X is selected from the group consisting of alkali metal ions and ammoniumion; and N,N-diacetic acid derivatives of dithiocarbamate compounds having the formula

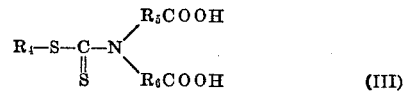 (III)

wherein $R_5$ and $R_6$ are the same or different and are selected from the group consisting of alkylene, alkenylene, arylene and alkylenoxy, $R_4$ is selected from the group consisting of hydrogen, alkyl, aryl, alkenyl and alkoxy; and developing the imagewise exposed composition with at least one chelating metal salt of an aliphatic or inorganic acid to produce a colored image in the unexposed areas of said composition, wherein the metal is selected from the group consisting of copper, iron, cobalt, nickel, manganese, bismuth, mercury, lead, barium, molybdenum, gold, silver, cadmium and zinc.

2. A process for forming a colored image according to claim 1 wherein the dithiocarbamate compounds are compounds having the following formulas:

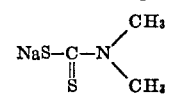

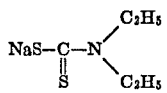

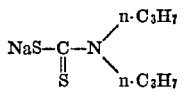

and

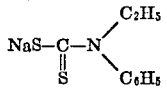

3. A process for forming a colored image according to claim 1 wherein the thioxanthate compounds are compounds having the following formulas:

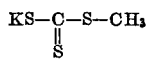

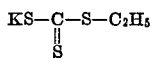

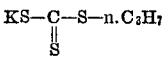

and

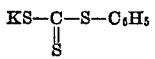

4. A process for forming a colored image according to claim 1 wherein the N,N-diacetic acid derivatives of dithiocarbamate compounds are compounds having the following formulas:

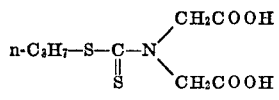

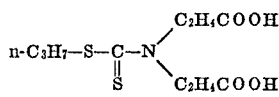

and

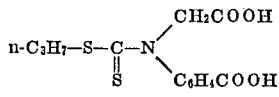

5. A process for forming a colored image according to claim 1 wherein the self-supporting material is selected from the group consisting of paper, resin, glass, metal, fiber, wood and ceramics.

6. A process for forming a colored image which comprises imagewise exposing to light a first composition on a self-supporting material capable of undergoing photolysis in the presence of said light said composition comprising at least one compound selected from the group consisting of dithiocarbamate compounds having the formula

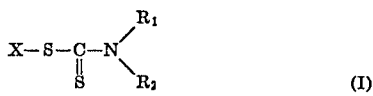

wherein $R_1$ and $R_2$ are the same or different and are selected from the group consisting of hydrogen, alkyl, alkenyl, aryl and alkoxy, X is selected from the group consisting of alkali metal ions and ammonium ion; thioxanthate compounds having the formula

wherein $R_3$ is selected from the group consisting of hydrogen, alkyl, alkenyl, aryl and alkoxy, X is a member selected from the group consisting of alkali metal ions and ammonium ion; and N,N-diacetic acid derivatives of dithiocarbamate compounds having the formula

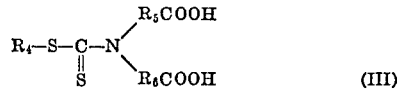

wherein $R_5$ and $R_6$ are the same or different and are selected from the group consisting of alkylene, alkenylene, arylene, and alkylenoxy, $R_4$ is selected from the group consisting of hydrogen, alkyl, aryl, alkenyl and alkoxy; optical sensitizer; chemical sensitizer; stabilizer and plasticizer; and developing the imagewise exposed first composition with a second composition comprising at least one chelating metal salt of an aliphatic or inorganic acid to produce a colored image in the unexposed areas of said imagewise exposed first composition, wherein the metal is selected from the group consisting of copper, iron, cobalt, nickel, manganese, bismuth, mercury, lead, barium, molybdenum, gold, silver, cadmium and zinc.

7. A process for forming a colored image according to claim 6 wherein at least one of the compositions is supported by a binder.

References Cited
UNITED STATES PATENTS 3,094,417   6/1963   Workman _____ __96—90 X
3,597,210   8/1971   Bigelow _____ 96—108

J. TRAVIS BROWN, Primary Examiner
W. H. LOUIE, Jr., Assistant Examiner

U.S. Cl. X.R.
96—76, 88